N. GODFREY.
BROILING RACK.
APPLICATION FILED SEPT. 23, 1919.

1,331,058.

Patented Feb. 17, 1920.

Inventor:
Nellie Godfrey

UNITED STATES PATENT OFFICE.

NELLIE GODFREY, OF FITCHBURG, MASSACHUSETTS.

BROILING-RACK.

1,331,058. Specification of Letters Patent. Patented Feb. 17, 1920.

Application filed September 23, 1919. Serial No. 325,626.

*To all whom it may concern:*

Be it known that I, NELLIE GODFREY, a subject of the King of Great Britain, residing at Fitchburg, in the county of Worcester and State of Massachusetts, have invented a certain new and useful Broiling-Rack, of which the following is a specification, reference being had therein to the accompanying drawings.

My invention is adapted to be mounted over the fire holes of a cooking stove or range.

Its purpose is to provide means whereby the fire will not only keep the oven hot for all purposes, but will be suitable for properly broiling meats, fish, etc., while the stove lids are removed.

It is obvious that a cook's desire is to provide a meal not only properly cooked, but one that is served hot; that, necessarily, various foods are in process of preparation and cooking at the same time; that some of them must be in the ovens, and upon the stove, up to the last moment; that for broiling, a quick, hot fire is required, but that such fire quickly cools, as likewise do the ovens; that the fire hot enough for the ovens, may be too hot for the meats to broil by themselves over the fire, in which case, the cook has to give, say, 20 minutes constant attention to manually turning the wire broiler and contained meat, over the fire, to prevent burning the meat, when she ought to be preparing, for example, sauces, puddings, entrées, and engaging in many of the duties involved in cooking and serving, say, a luncheon or dinner, at a particular hour.

It is also obvious that if the fire is low enough to prevent burning the meat, and thus to require no watching of the broiling, then the fire is not suitable for finishing up the dishes in the oven, or on the stove, which, as has already been stated, ought to be very hot.

Often, with a hot fire, the cook cannot properly attend to these many details; and instead of entirely broiling the meat, she broils it for five or six minutes, and completes the cooking of it in the oven,—the result being that the meat is not cooked entirely by broiling.

Further, an orderly and easy scheme for preparing and serving a meal as it should be, is frequently upset because the cook is harassed by the ever present fear that the meat broiling over the stove fire, is being burned, or becoming smoked by the burning of fat drippings; or that, if the meat is not burned, then that the ovens are cooling; all the consequences of which, are likely to be the cook's loss of temper, and a meal not perfectly prepared.

In fine, where broiling is required, with the preparation of other dishes, the heat of the fire is not suitable for all of the cooking.

Now the object of my invention may be said to provide means whereby a fire sufficiently hot to heat the ovens properly, will broil meats without burning or smoking the same, and enable the cook to attend to the preparation of dishes equally important to broiled meats, without anxiety on her part.

While the embodiment of my invention is exceedingly simple in construction, and cheap to manufacture, it is of the greatest utility, and has made the preparation of a meal comprising numerous dishes, including broiled meat, a pleasure instead of a difficulty.

In the drawings illustrating the principle of my invention and the best operative structure embodying the same now known to and made by me, Figure 1 is a perspective view of the combination of a cooking-range and a broiling-rack fully extended, mounted over a large square fire opening in the range;

Figure 1:
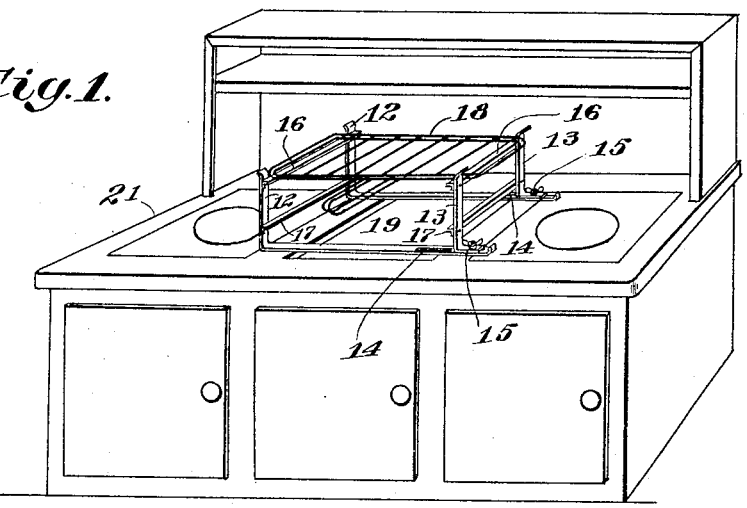
Figure 2:
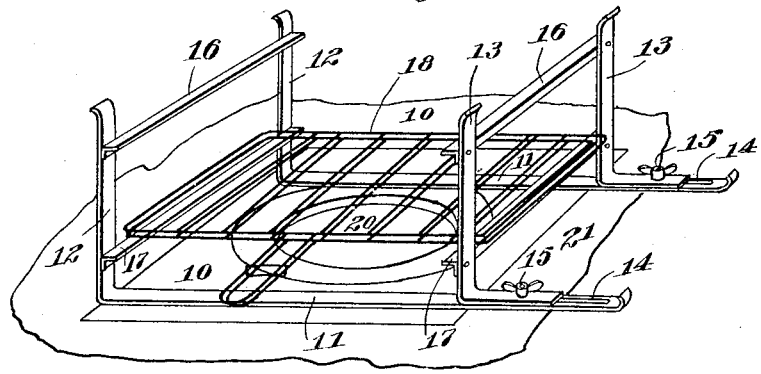
Fig. 2 is an enlarged detail showing the broiling rack partially extended over a small circular fire opening, and supporting a smaller wire-broiler than is shown in Fig. 1.
Figure 3:
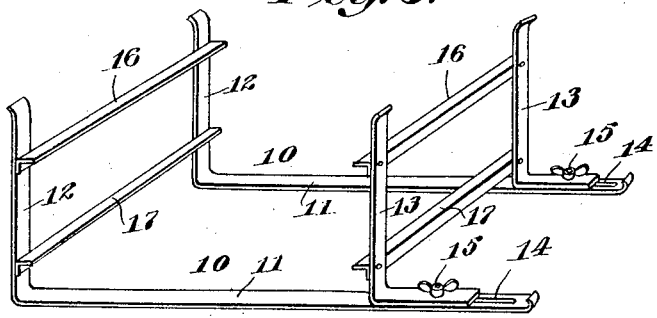
Fig. 3 is an enlarged perspective view of the broiling-rack alone.

A metal frame, or broiling-rack, see Fig. 3, preferably of wrought iron, is made up of two parallel members 10, 10, each having a horizontal base portion 11, and an upturned vertical end portion 12; two vertically arranged standards 13, 13, adjustably mounted on the horizontal base portion of the parallel members, by means of longitudinal slots 14, 14, and binding screws 15, 15; the said members 10, 10, being held in parallelism by transverse metal rests 16, 16, 17, 17, fixed to the vertical upright end portions 12, 12, and the vertical standards 13, 13. Upon these rests 16, 16, or 17, 17, may be supported an ordinary wire broiling frame, 18, Figs. 1 and 2, for containing the food to be broiled or toasted; the standards 13, 13, being adjusted so that the rests 16, 16, or 17, 17, may support any usual width of broiling frame at the required distance above a large or a smaller fire opening 19 or 20 of the range 21, as shown in Figs. 1 and 2.

Without further explanation, it is evident that the cook using my invention, is at liberty to attend to all her duties including that of broiling, for the reason that by means of the rack, the food to be broiled, is broiled by a hot, oven-heating fire, but is in no danger of burning, because the rack containing it is mechanically supported upon one of the sets of rests, at such a distance above the fire that while the fire is hot enough for preparing the other food above mentioned, it cannot burn the food that is being broiled.

In fine, while it may be said that by the old method, foods were frequently served indifferently hot and cooked, by reason of low broiling fires and cool ovens, by the new method, there results a hot, well cooked meal brought about by a hot broiling fire and a hot oven.

Desiring to protect my invention in the broadest manner legally possible,

What I claim is:

Two metallic parallel rods, each having a horizontal base portion, and a vertical upturned end portion; two vertical standards, each having a base portion mounted upon the base portion of one of said rods; means to adjustably secure, horizontally, said vertical standard to its respective rod; horizontal metallic rests fixed to said vertical upturned end portions of said rods, and like rests fixed to said standards, to hold said rods and said standards in parallelism, and to support a wire broiling-frame, at a suitable distance above the base portions of said rods.

In testimony whereof I hereunto affix my signature.

NELLIE GODFREY.